Aug. 7, 1928.
L. BLACKMORE
1,680,006
WINDSHIELD WEATHER STRIP
Filed June 23, 1924
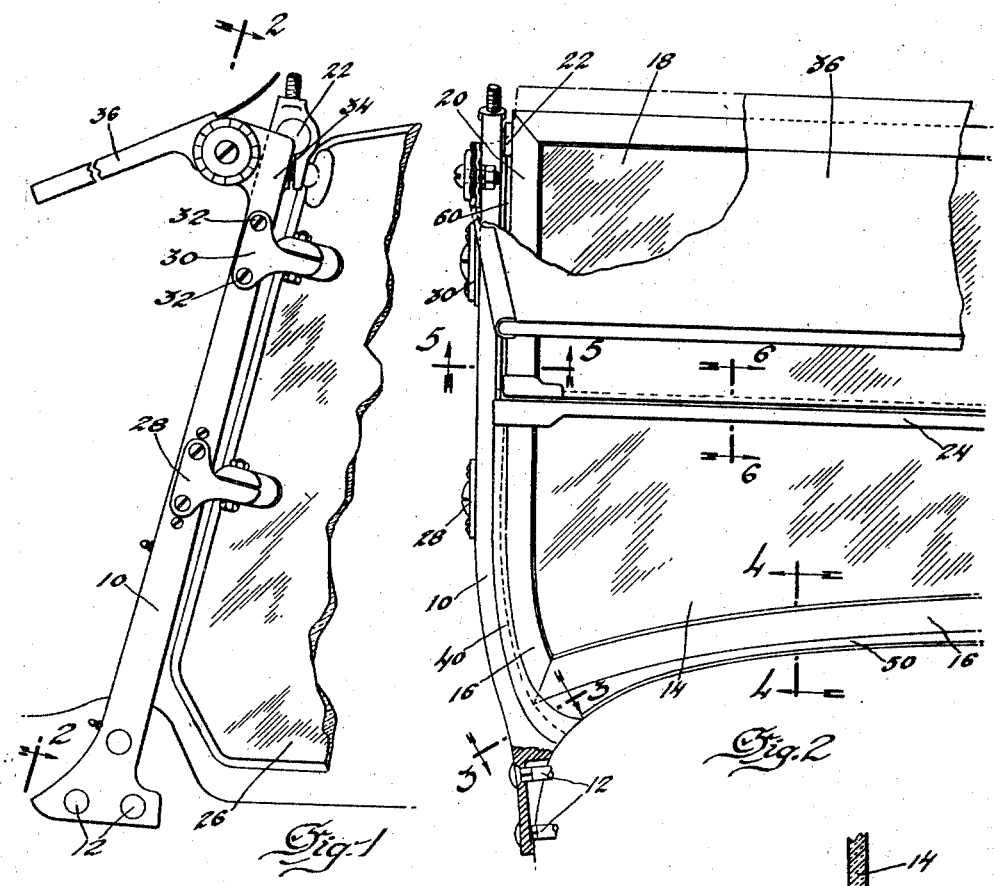
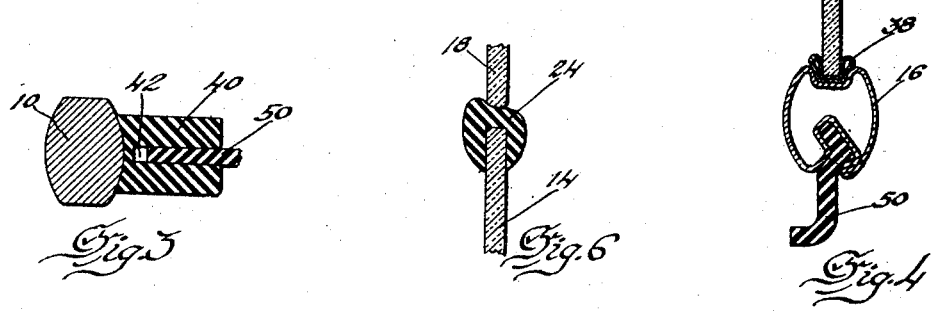
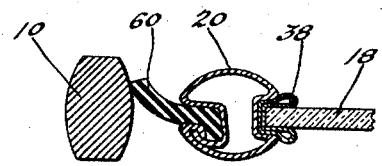
Inventor
Lloyd Blackmore.

Patented Aug. 7, 1928.

1,680,006

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

WINDSHIELD WEATHER STRIP.

Application filed June 23, 1924. Serial No. 721,796.

This invention relates to automobile windshields, and has for an object the use of a flat strip of rubber or the equivalent as a windshield weatherstrip, by forming the windshield frame member with a channel which is sharply bent in cross-section, so that the strip is held firmly by its own resilience on account of the distortion caused by the peculiar shape of the channel. Preferably the frame member is a hollow metal tube with the channel along one edge.

This and other desirable features will be apparent from the following description of one illustrative embodiment of the invention shown in the accompanying drawings, in which:

Figure 1 is a side elevation of a windshield, and an associated visor and windshield wing;

Figure 2 is a front elevation of the same parts;

Figure 3 is a section on the line 3—3 of Figure 2, showing part of the sealing means;

Figure 4 is a section on the line 4—4 of Figure 2, showing one weatherstrip in its channel;

Figure 5 is a section on the line 5—5 of Figure 2, showing another weatherstrip in its channel; and Figure 6 is a section on the line 6—6 of Figure 2, showing the joint between the upper and lower glass panes of the windshield.

The invention is shown embodied in a windshield comprising side stanchions 10 arranged to be secured to the cowl of an automobile by bolts 12, and carrying a lower fixed pane 14 of glass held on three edges by a frame 16 of hollow metal tubing, and an upper movable pane 18 of glass held on three edges by a frame 20 of hollow metal tubing pivoted at 22 on the stanchions. The space between the panes, when the windshield is closed, is sealed by a U-shaped strip 24 of rubber straddling the lower pane 14. A windshield wing 26 is held by a lower bracket 28 and by an upper bracket 30 secured by tap screws 32 which also hold one bracket 34 of the visor 36. Each pane 14 and 18 is seated in channels formed in the edges of the hollow tube members of the frames 16 and 20, cushioned if desired by strips 38 of felt or the like. Each side member of the frame 16 carries a rubber filling piece 40 concaved to embrace tightly and seal against the corresponding stanchion 10. Below the bottom edge of the bottom member of frame 16, the filling pieces 40 project into engagement with the cowl, and on their inner sides are grooved at 42 (Figure 3).

The bottom member of frame 16 is also provided on its lower edge with a reentrant channel, having a sharp bend in cross-section as shown in Figure 4, for a sealing strip 50 of rubber or the like. Thus the strip 50 may be substantially rectangular in cross-section, since it is held in place by its own inherent resilience due to the sharp bend in the channel, and this permits extending the strip into the grooves 42 (Figure 3), thus sealing the entire lower edge of the windshield.

Each side member of the frame 20 is provided on its outer edge with a reentrant channel, shown as forming a right angle in cross section, for a sealing strip 60 engaging the corresponding stanchion 10. Thus each strip 60 may also be substantially rectangular in cross-section, since it is held by its own distortion, and may in fact be cut from the same length of stock as strip 50.

While one particular windshield construction has been described in detail, it is not my intention to limit the scope of the invention to that construction, or otherwise than by the terms of the appended claims.

I claim:

1. A windshield part comprising, in combination, a hollow metal tube member having a channel along one edge for a pane of glass and having a sharply-bent reentrant channel of uniform width along its opposite edge, and a rubber strip of uniform thickness throughout and of substantially rectangular cross-section held along one edge of the reentrant channel and retained in the channel by reason of its elasticity.

2. A windshield part comprising, in combination, a frame member having along one edge a reentrant channel of uniform width throughout its extent, the channel having in cross section a sharp bend, and a rubber strip held along one edge in the channel by its inherent resilience as it is held distorted by said bend, said edge within the channel corresponding in thickness with the uniform width of the channel.

3. The combination of a body part, a windshield mounted in operative relation with said body part and comprising a frame member having a channel therein for receiving a pane of glass, and a second channel therein having sides and a bottom member, said sides being substantially parallel but distorted to provide a tortuous channel, and a flat strip of rubber gripped in said channel and distorted thereby to hold it against dislodgment, said strip projecting outwardly from the frame into contact with said body part whereby said strip is distorted into close fitting and sealing relation with said body part.

4. The combination of a body part, upright stanchions carried thereby, a windshield mounted on said stanchion in operative relation with said body part, and including a frame member pivoted to said stanchions and relatively adjustable therewith, the portions of the frame adjacent each stanchion being provided with a channel having substantially parallel sides, but distorted to provide a tortuous channel, and a flat strip of elastic deformable material extending into said channel and deformed therein to resist dislodgment and projecting outwardly therefrom, such strips being adapted to contact with the stanchions when the frame is adjusted into the plane of said stanchions, whereby the strips are distorted into close fitting and sealing relation with said stanchions.

In testimony whereof I affix my signature.

LLOYD BLACKMORE.